US012495737B2

(12) United States Patent
Ballewar et al.

(10) Patent No.: US 12,495,737 B2
(45) Date of Patent: Dec. 16, 2025

(54) ROLL ASSEMBLY FOR COTTON HARVESTER

(71) Applicant: DEERE & COMPANY, Moline, IL (US)

(72) Inventors: Sachin Ballewar, Chandrapur (IN); Brandon C. Carlson, Ankeny, IA (US); Adam R. Eaker, Ankeny, IA (US)

(73) Assignee: DEERE & COMPANY, Moline, IL (US)

( * ) Notice: Subject to any disclaimer, the term of this patent is extended or adjusted under 35 U.S.C. 154(b) by 1057 days.

(21) Appl. No.: 17/447,589

(22) Filed: Sep. 14, 2021

(65) Prior Publication Data

US 2023/0078938 A1    Mar. 16, 2023

(51) Int. Cl.
*A01D 46/08*    (2006.01)
*A01D 46/12*    (2006.01)

(52) U.S. Cl.
CPC ............. *A01D 46/08* (2013.01); *A01D 46/12* (2013.01)

(58) Field of Classification Search
CPC ........ A01D 46/00–46/30; A01D 46/08; A01D 46/12; A24B 5/00–5/16; A01G 5/00–5/06
See application file for complete search history.

(56) References Cited

U.S. PATENT DOCUMENTS

| | | | | |
|---|---|---|---|---|
| 1,145,441 A | * | 7/1915 | Scovill | A24B 5/06 131/321 |
| 1,836,547 A | * | 12/1931 | Onsrud | A01D 46/10 56/32 |
| 2,673,440 A | * | 3/1954 | Sawyer | A01D 46/12 56/33 |
| 2,701,438 A | * | 2/1955 | Sawyer | A01D 46/12 56/33 |
| 2,760,325 A | * | 8/1956 | Witt | A01D 46/10 56/33 |
| 2,825,195 A | * | 3/1958 | Smith | A01D 46/12 56/33 |
| 2,825,197 A | * | 3/1958 | Smith | A01D 46/12 56/33 |

(Continued)

FOREIGN PATENT DOCUMENTS

| | | | | |
|---|---|---|---|---|
| DE | 102005021467 A1 | * | 11/2006 | ............... A46B 3/14 |
| SU | 100454 A1 | * | 11/1954 | |

(Continued)

*Primary Examiner* — Joseph M Rocca
*Assistant Examiner* — Madeline I Runco (57) ABSTRACT

Roll assemblies for cotton harvesters and associated methods are disclosed. Example roll assemblies may include a unitary component that defines a plurality of slots. Bats and brushes may be removably retained within the slots. The unitary component may include a plurality of lobes with the plurality of slots defined therebetween. A central passage may be formed in a central portion of the unitary component. A shaft having an interlocking shape may be removably received within the central passage. In some implementations, one or more lobes are removably securable to the unitary component. End caps may be received onto the shaft and positioned adjacent to ends of the unitary component to assist in retaining the bats and brushes to the unitary component.

15 Claims, 8 Drawing Sheets

(56) References Cited

U.S. PATENT DOCUMENTS

| | | | | |
|---|---|---|---|---|
| 3,171,241 | A * | 3/1965 | Streb | A01D 46/08 |
| | | | | 56/33 |
| 3,678,633 | A * | 7/1972 | Block | B24D 13/06 |
| | | | | 451/469 |
| 5,490,301 | A * | 2/1996 | Droeser | A46B 13/005 |
| | | | | 15/183 |
| 8,074,318 | B2 * | 12/2011 | Launiemi | A46B 3/14 |
| | | | | 15/179 |
| 8,790,228 | B2 * | 7/2014 | Wirth | A01D 46/12 |
| | | | | 264/239 |
| 9,415,482 | B2 * | 8/2016 | Jespersen | B24D 13/06 |
| 2002/0069632 | A1 * | 6/2002 | Goering | A01D 46/08 |
| | | | | 56/28 |
| 2011/0143899 | A1 * | 6/2011 | Wirth | A01D 46/12 |
| | | | | 264/239 |
| 2017/0347525 | A1 * | 12/2017 | Goering | A01D 46/08 |

FOREIGN PATENT DOCUMENTS

| | | | |
|---|---|---|---|
| SU | 1258354 | A1 * | 9/1986 |
| SU | 1701159 | A1 * | 12/1991 |

* cited by examiner

ROLL ASSEMBLY FOR COTTON HARVESTER

FIELD OF THE DISCLOSURE

The present disclosure relates generally to cotton harvester and, particularly, to roll assemblies used to remove cotton from a plant.

BACKGROUND OF THE DISCLOSURE

Cotton harvesters, such as cotton strippers and cotton pickers, include a head that harvests cotton. Some cotton harvesters include roll assemblies that are rotated as the cotton harvester is moved through a field. In some cases, the removed cotton is subsequently processed, such as to remove undesired vegetation.

SUMMARY OF THE DISCLOSURE

A first aspect of the present disclosure is directed to a roll assembly for a cotton harvester. The roll assembly may include a unitary component. The unitary component may include a central portion forming a central passage; a plurality of lobes radially arranged about the central portion; and a plurality of radially arranged first slots formed between adjacent lobes of the plurality of lobes. The roll assembly may also include one of a bat or a brush disposed in each of the plurality of first slots.

A second aspect of the present disclosure is directed to a method. The method may include inserting one of a bat or a brush into a first longitudinally extending first slot defined at least partially by an elongated unitary component; and inserting the other of the bat or brush into a second longitudinally extending first slot; inserting a shaft into a central passage formed in the elongated unitary component.

The various aspects may include one or more of the following features. The first slots may have a tapered cross-sectional shape. The first slots may taper outwardly. The one of a bat or a brush disposed in the plurality of first slots may include an arrangement in which a bat and a brush are disposed in an alternating arrangement within the first slots. A shaft may be receivable into the central passage. The shaft and the central passage may have interlocking shapes that prevent rotation of the unitary component relative to the shaft. An end cap may be removable receivable onto the shaft and disposed adjacent to an end of the unitary component. The end cap may include a plurality of flange segments. Each flange segment may be received over a portion of one of the lobes. A second slot may be formed between adjacent flange segments, and one of the bats or the brushes may be received into each of the second slots. The plurality of lobes may include first lobes, and an interstice may be formed between adjacent first lobes. Second lobes may be receivable into the interstices, and at least one of the first slots may be defined by a side of one of the first lobes and a side of one of the second lobes. At least one of the second lobes may define a tapered cross-sectional shape. The unitary component further may also include a third slot formed along the unitary component. A fastener may be removable receivable into the third slot to secure one of the second lobes to the unitary component. At least one of the plurality of lobes may have an inwardly tapered cross-sectional shape. The plurality of lobes may be hollow. Each of the plurality of lobes may be angularly offset from another of the plurality of lobes by 60°.

The various aspects may include one or more of the following features. The elongated unitary component may include a central portion forming a central passage and a plurality of lobes radially arranged about the central portion. The longitudinally extending first slots may be formed between the plurality of lobes. The elongated unitary component may include a plurality of first lobes and a plurality of interstices, each interstice formed between adjacent first lobes. A second lobe may be installed into at least one of the interstices. The first longitudinally extending slots may be defined between a side of the second lobes and a side of the first lobes. one of the second lobes may be installed to the elongated unitary component with a fastener.

Other features and aspects will become apparent by consideration of the detailed description and accompanying drawings.

BRIEF DESCRIPTION OF THE DRAWINGS

The detailed description of the drawings refers to the accompanying figures in which.

DETAILED DESCRIPTION

For the purposes of promoting an understanding of the principles of the present disclosure, reference will now be made to the implementations illustrated in the drawings, and specific language will be used to describe the same. It will nevertheless be understood that no limitation of the scope of the disclosure is intended. Any alterations and further modifications to the described devices, systems, or methods and any further application of the principles of the present disclosure are fully contemplated as would normally occur to one skilled in the art to which the disclosure relates. In particular, it is fully contemplated that the features, components, and/or steps described with respect to one implementation may be combined with the features, components, and/or steps described with respect to other implementations of the present disclosure.

The present disclosure is directed to roll assemblies (sometimes referred to as "bat and brush roll assemblies") that are used in cotton harvesters to remove cotton during harvesting. During harvesting, roll assemblies provided on a cotton harvester are rotated, and features referred to as bats and brushes contact cotton plants to remove cotton therefrom. The roll assemblies within the scope of the present disclosure provide a reduced part count which results in reduced complexity, reduced assembly time, and reduced manufacturing time. Consequently, the roll assemblies involve reduced labor and manufacturing costs. Further, the construction of the roll assemblies described herein reduce maintenance costs by reducing an amount of time to service the roll assemblies, such as by replacing bats or brushes included in the roll assemblies. Further, example roll assemblies described herein have a reduced mass, which results in reduced component and operating costs.

Figure 1:
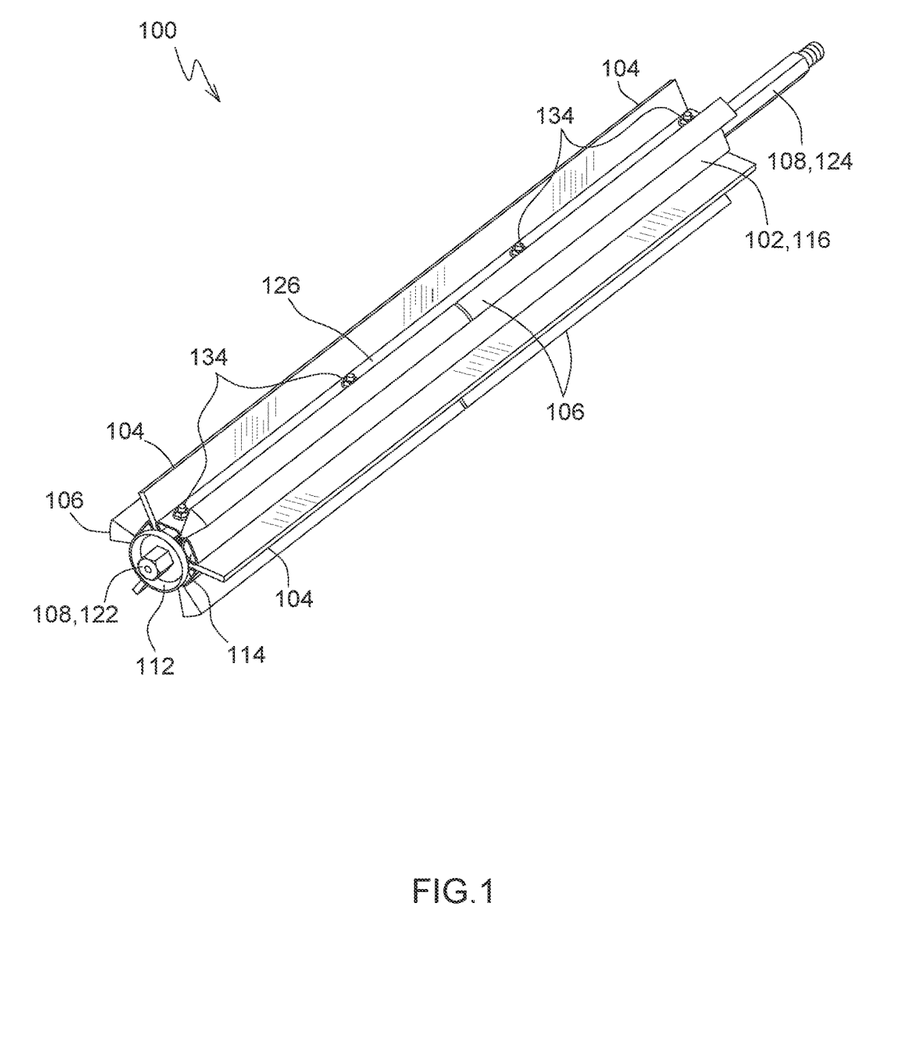
FIG. 1 is an oblique view of an example roll assembly, according to some implementations of the present disclosure.
Figure 2:
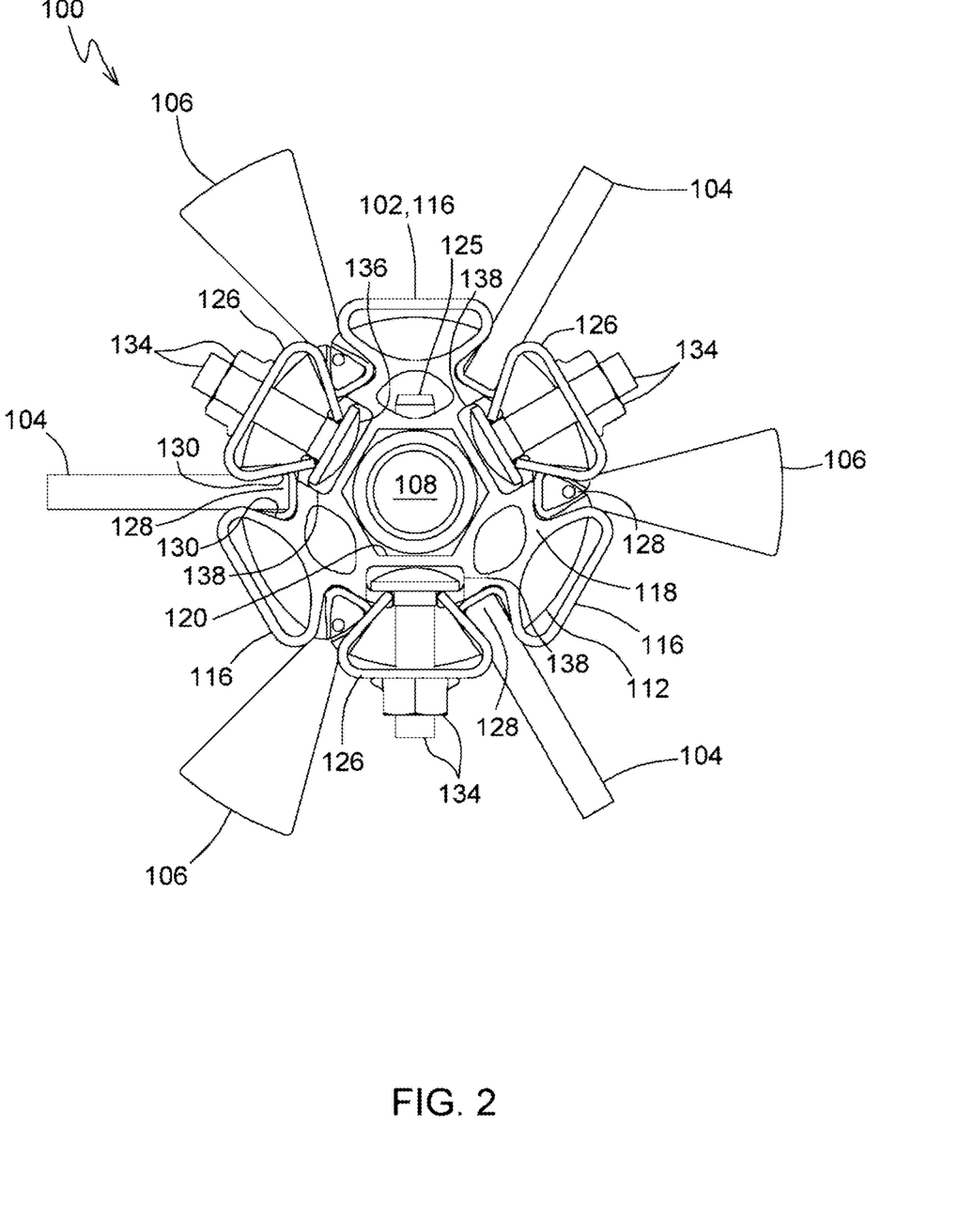
FIG. 2 is a cross-sectional view of the roll assembly of FIG. 1.
Figure 3:
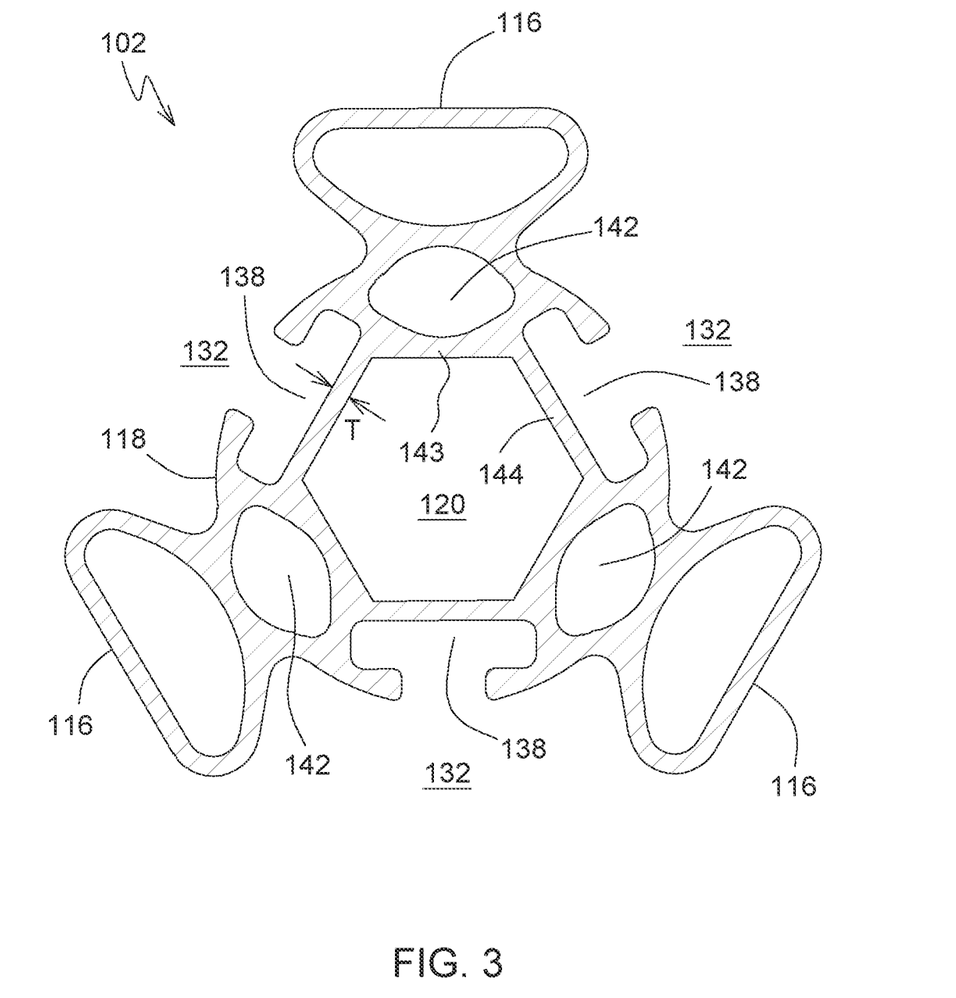
FIG. 3 is a cross-sectional view of a unitary component of the roll assembly of FIG. 1.

FIGS. 1 through 3 are various views of an example roll assembly 100 and portions thereof. Referring to FIGS. 1 through 3, the roll assembly 100 includes a unitary component 102, a plurality of bats 104 and a plurality of brushes 106 coupled to the unitary component, a shaft 108 receivable into a central passage 120 formed in the unitary component 102, and end caps 112 received onto the shaft 108 and disposed adjacent to ends 114 of the unitary component 102. In some implementations, the end caps 112 abut against the ends 114 of the unitary component 102. In some implementations, the end caps 112 assist in maintaining alignment of the bats 104 and brushes 106 and retaining the bats 104 and brushes 106 on the unitary component 102. In some implementations, the end caps 112 are freely slidable along the shaft 108.

Figure 7:
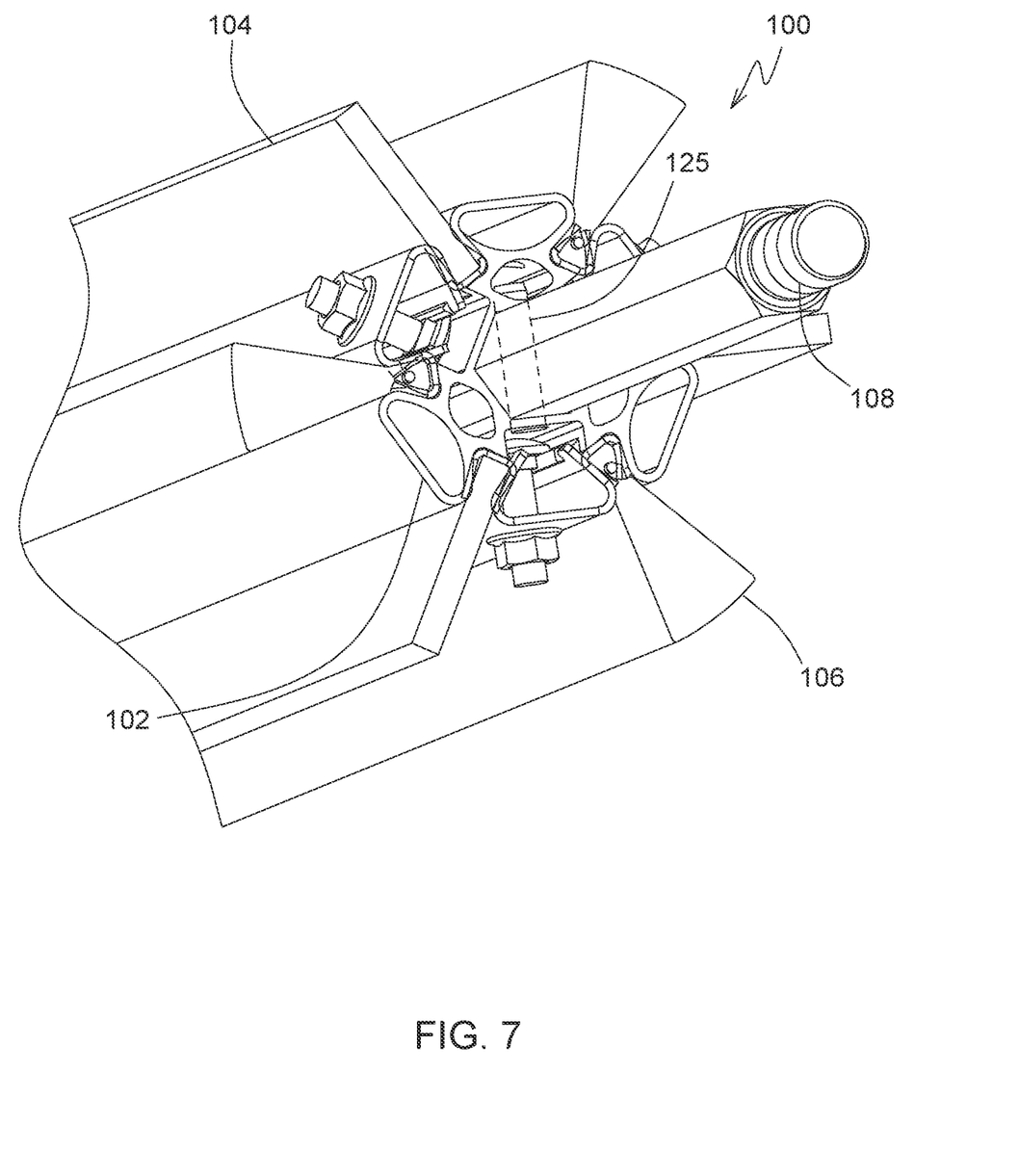
FIG. 7 is a detail oblique view of the roll assembly of FIG. 1.

Referring particularly to FIGS. 2 and 3, the unitary component 102 includes a plurality of first lobes 116 and a central portion 118 integrally formed with the first lobes 116. The central portion 118 defines a central passage 120 in which the shaft 108 is received. In some instances, the shaft 108 is coupled to the unitary component 102 with one or more pins 125, as shown in FIGS. 2 and 7. The pins 125 extend through the unitary component 102 and through the shaft 108 to maintain a connection between therebetween and a position of the shaft 108 relative to the unitary component 102. In still other implementations, the shaft 108 and unitary component 102 may be coupled in other ways.

In some implementations, the shaft 108 includes a first portion 122 and a second portion 124 (shown in FIG. 1). In some implementations, the first portion 122 and the second portion 124 are not directly coupled. Rather, in some instances, the first and second portions 122 and 124 of shaft 108 are coupled to the unitary component 102 via pins 125, as shown in FIGS. 2 and 7. Dividing the shaft 108 into the first and second portion 122 and 124 provides for increased ease of maintenance of the roll assembly 100, such as when one or more of the bats 104 or brushes 106 is desired to be replaced. Increasing the ease of maintenance in this way results in a reduced amount of time needed to service the roll assemblies, resulting in reduced maintenance costs and reduced downtime for the associated cotton harvester. In the case of a unitary shaft 108, in some instances, pins 125 are also used to couple the shaft 108 to the unitary component 102.

In the illustrated example, the central passage 120 has a hexagonal cross-sectional shape, and the shaft 108 has a complementary cross-sectional shape, i.e., hexagonal. Thus, the cross-sectional shape of the shaft 108 is sized and shaped to be received into the central passage 120. In this way, the shaft 108 and central passage 120 interlock to prevent rotation of the unitary component 102 relative to the shaft 108. In other implementations, the shaft 108 and the central passage 120 have other interlocking cross-sectional shapes, such as other types of polygonal shapes or any other mating shapes that prevent relative rotation.

The roll assembly 100 also includes a plurality of second lobes 126, shown in FIG. 2. In the illustrated example, the second lobes 126 are removably attached to the unitary component 102. The first lobes 116 and the second lobes 126 have an alternating arrangement and cooperate to clamp and retain the bats 104 and brushes 106 to the unitary component 102. In the illustrated example, there are a total of six first and second lobes 116 and 126. As a result, there are a total of six bats 104 and brushes 106. The first and second lobes 116 and 126 are angularly offset from each other by 60°. In other implementations, there may be additional or fewer first and second lobes 116 and 126. In some implementations, the first and second lobes 116 and 126 are uniformly angularly arranged about the central passage 120. In other implementations, the first and second lobes 116 and 126 may be non-uniformly angularly arranged about the central passage 120.

First slots 128 that receive the bats 104 and brushes 106 are formed between adjacent lobes 116, 126. In the illustrated example, the first slots 128 have a tapered cross-sectional shape. The first slots 128 taper radially outwardly, forming a generally triangular shape. The tapered shape of the first slots 128 operates to retain the bats 104 and brushes 106 to the unitary component 102 and prevent separation of the bats 104 and brushes 106 as the roll assembly 100 is rotated, such as during cotton harvesting.

The first and second lobes 116 and 126 have a generally inwardly tapered shape. Sides 130 of the lobes 116 and 126 define the first slots 128 and the associated outwardly tapering shapes thereof. Further, in the illustrated example, the lobes 116 and 126 are hollow, which reduces a total mass and rotational inertia of the roll assembly 100. Reducing the rotational inertia of the roll assembly 100 reduces an amount of energy required to rotate the roll assembly 100 at a desired rotational speed, thereby reducing energy costs associated with operating the cotton harvester.

As shown in FIG. 3, the second lobes 126 are removed, which produces interstices 132 formed between adjacent first lobes 116. The interstices 132 are occupied by the second lobes 126 when coupled to the unitary component 102. The second lobes 126 are removable to facilitate replacement of the bats 104 and brushes 106.

As shown in FIG. 2, the second lobes 126 are secured to the unitary component 102 with fasteners 134. Example fasteners 134 include nuts and bolts (e.g., a carriage bolt or other type of bolts), screws, pins, or an interlocking arrangement. In other implementations, the second lobes 126 may be secured to the unitary component 102 with integrated interlocking components, such as spring-loaded detents or other features that releasably coupled the second lobes 126 to the unitary component 102.

As shown in FIGS. 2 and 3, ends 136 of the fasteners 134, e.g., bolts, are receivable into second slots 138 formed in the unitary component 102. The fasteners 134 extend through openings formed in the second lobes 126. The slots 138 extend longitudinally along the unitary component 102. The second slots 138 receive and retain the fasteners 134 and the second lobes 126 while providing sliding movement along a length of the unitary component 102. A position of the second lobes 126 relative to the unitary component 102 is fixed when the fasteners 134 are secured within the second slots 138, such as by tightening a nut onto a bolt.

In some implementations, the unitary component 102 is formed by extrusion. In some implementations, the unitary component 102 is formed from aluminum. In some instances, the unitary component 102 is an aluminum extrusion. However, in other implementation, other types of material or forming processes can be used. For example, in some instances, other materials such as magnesium, steel, iron, polymers, or composite materials are used to form the unitary component 102. Further, in some instances, the unitary component 102 is formed using machining techniques, such as electric discharge machining, water jetting, or plasma cutting. In still other implementations, the unitary components 102 is formed from two or more components that are permanently secured together using, for example, an adhesive or welding.

The unitary component 102 includes cavities 142. First webs 143 are defined between the cavities 142 and the central passage 120. The cavities 142 have an elongated curvilinear shape. As a result, a thickness of first webs 143 vary. Second webs 144, formed between the central passage 120 and second slots 138, have a uniform thickness T. A cross-sectional arrangement as shown in FIG. 3 promotes ease of manufacturing, such as during extrusion, and reduces mass of the unitary component 102.

Figure 8:
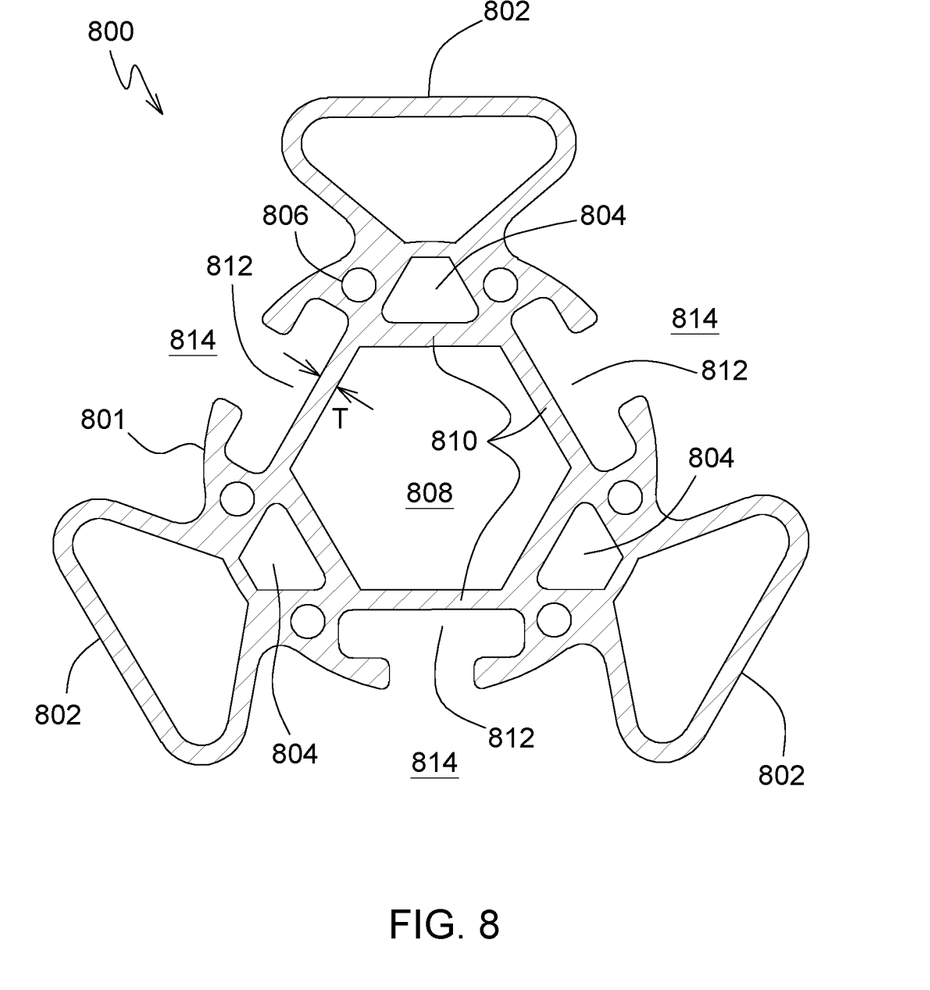
FIG. 8 is a cross-sectional view of another example unitary component, according to some implementations of the present disclosure.

Another example unitary component 800 is shown in FIG. 8. The unitary component 800 can be used in place of the unitary component 102 in the roll assembly 100. As shown in the cross-sectional view of FIG. 8, the unitary component 800 includes a central portion 801, hollow lobes 802 extending form the central portion 801, cavities 804 and 806, and a central passage 808. Longitudinally extending webs 810 are formed between the cavities 804 and the central passage 808 and between longitudinally extending second slots 812. Similar to the second slots 138, the second slots 812 are used to secure second lobes, similar to second lobes 126, to the unitary component 800. In some implementations, the webs 810 have a common thickness T. In some implementations, the thickness T of the webs 810 is uniform. In other implementations, the thickness T is not uniform. In other implementations, one or more webs 810 has a uniform thickness that varies from the thickness of one or more other webs 810. In some implementations, the thickness T of one or more webs 810 varies.

In the illustrated example, the cavities 804 and the second slots 812 are arranged to provide the common thickness T of the webs 810. Further, a generally triangular arrangement of the webs 810 as that shown in FIG. 8 provides for increased stiffness of the unitary component 800. In some instances, forming the unitary component with webs 810 having a common thickness promotes ease of manufacturing by extrusion. In other implementations, one or more of the cavities 804 and 806 may be omitted. The cavities 804 and the common thickness T of the webs 810 reduce a mass of the unitary component 800. Consequently, an amount of energy needed to operate a roll assembly that includes the unitary component 800 is reduced. The cavities 806 have circular cross-sectional shapes. The cavities 806 similarly are provided to reduce a mass of the unitary component 800. Interstices 814, similar to interstices 132 of the unitary component 102, are formed between adjacent lobes 802 and are configured to receive detachable lobes that may be similar to second lobes 126, described earlier.

As explained earlier, end cap 112 are received onto the shaft 108 and are disposed adjacent to opposing ends 114 of the unitary component 102. The end caps 112 operate as barriers that serve to protect bearings, located towards the outboard ends of the shaft 108, from debris. In some implementations, the end caps 112 abut ends 114 of the unitary component 102.

Figure 4:
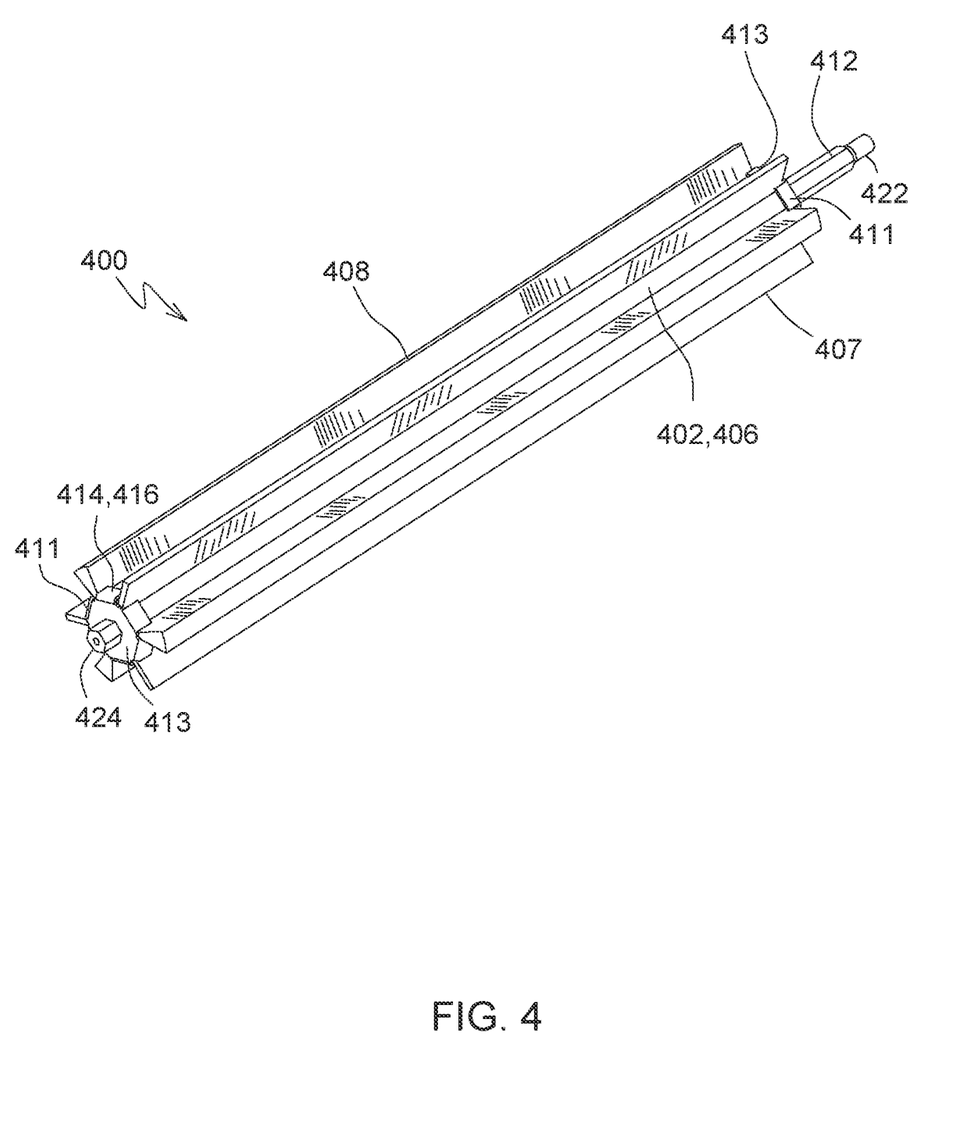
FIG. 4 is an oblique view of another example roll assembly, according to some implementations of the present disclosure.
Figure 6:
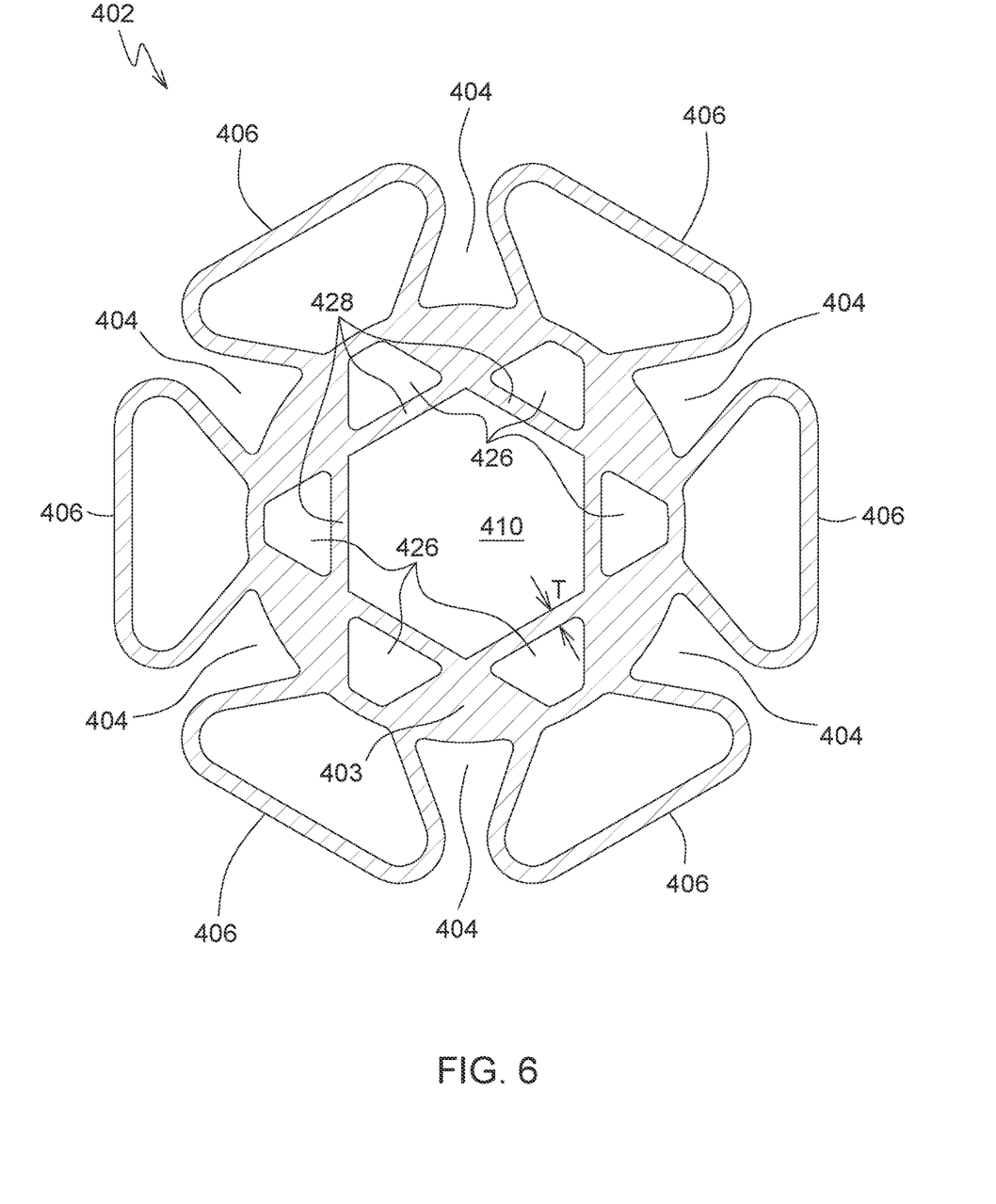
FIG. 6 is a cross-sectional view of a unitary component of the roll assembly of FIG. 4.

FIGS. 4-6 show another example roll assembly 400. FIG. 4 is an oblique view of the roll assembly 400. The roll assembly 400 includes a unitary component 402 that includes a central portion 403, a plurality of lobes 406 radially arranged and integrally formed on the central portion 403, and a plurality of slots 404 defined between adjacent lobes 406, as shown in FIG. 6. The slots 404 define a tapered cross-sectional shape. In the illustrated example, the lobes 406 define a tapered cross-sectional shape and are hollow, reducing the overall mass of the unitary component 402 and, thus, the roll assembly 400. In the illustrated example, the lobes 406 taper inwardly towards a center of the unitary component 402. The slots 404 retain bats 407 and brushes 408. The slots 404 taper outwardly, thereby forming a generally triangular shape that acts to secure and retain the bats 407 and brushes 408. In the illustrated example, three are six lobes 406 that are uniformly radially arranged about a central passage 410 (shown in FIG. 6) formed in the central portion 403 of the unitary component 402. Consequently, there are six slots 404 formed between adjacent lobes 406 that are also uniformly radially arranged about a central passage 410. Thus, in the illustrated example, adjacent lobes 406 and slots 404 are angularly offset by 60°. In other implementations, additional or fewer lobes 406 and slots 404 may be included. Further, in some implementations, the lobes 406 and the slots 404 may be non-uniformly angularly arranged about the central passage 410.

Figure 5:
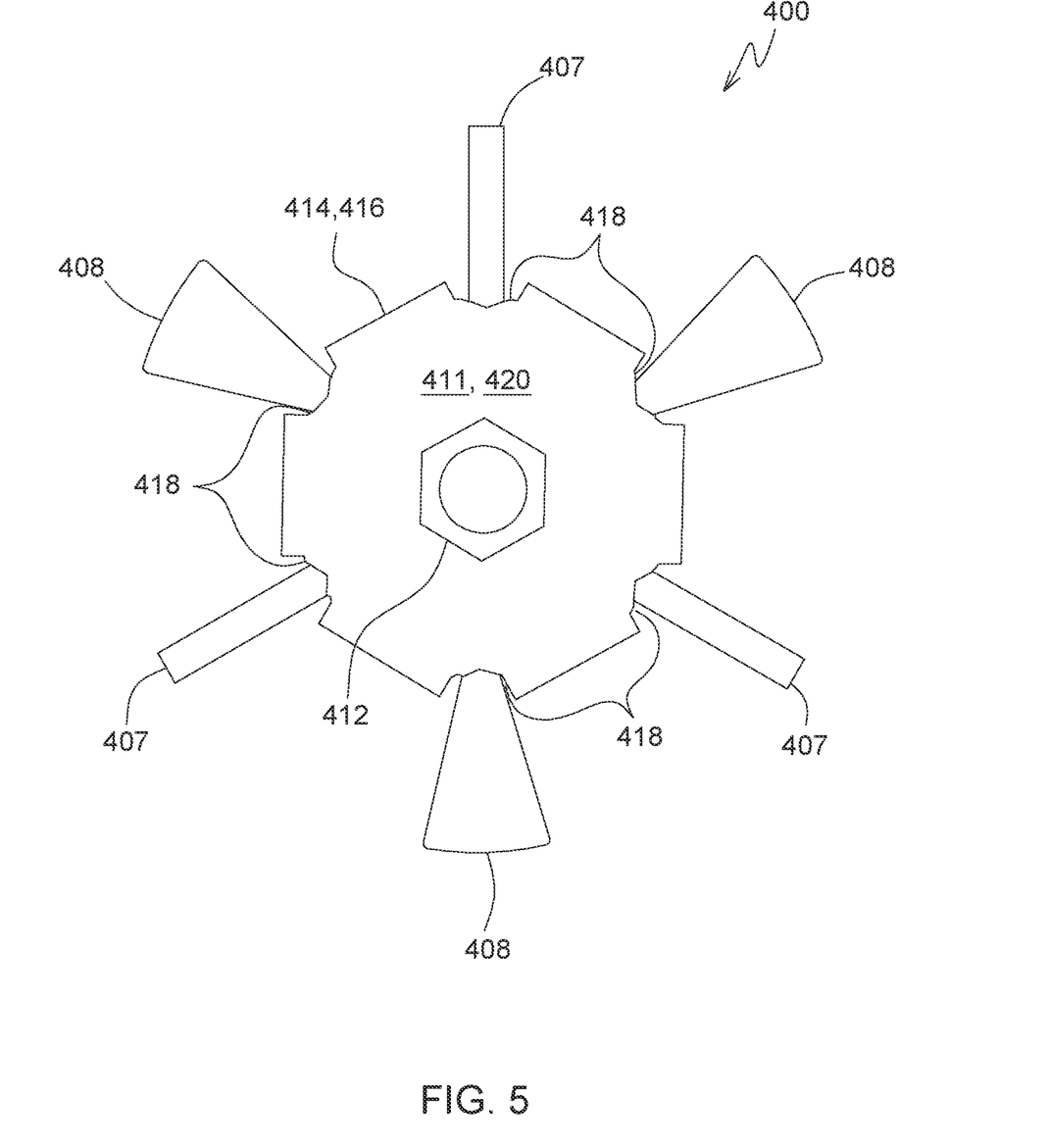
FIG. 5 is an end view of the roll assembly of FIG. 4.

The roll assembly 400 also includes end caps 411 and a shaft 412 that is received into the central passage 410 of the unitary component 402. The end caps 411 are received onto the shaft 412 and are positioned adjacent to ends 413 of the unitary component 402. In some implementations, the end caps 411 are in abutting contact with the ends 413 of the unitary component 402. The end caps 411 includes flanges 414 that extend from an end portion 420. The flanges 414 are divided into flange segments 416. Slots 418 are defined between adjacent flange segments 416. The flange segments 416 overlay an end portion of the lobes 406, and the slots 418 receive end portions of the bats 407 and brushes 408 that are located in the slots 404. The end portion 420 of the end caps 411 are positioned adjacent to the ends 413 of the unitary component 402. In some implementations, the end caps 411 assist in retaining the bats 407 and brushes 408 in the respective slots 404 and maintaining alignment of the bats 407 and brushes 408 within the slots 404. Similar to the end caps 112, the end caps 411 operate to protect bearings located outboard of the unitary component 402 from debris, such as dirt and plant matter stirred up during harvesting. In some implementations, the end caps 411 are freely slidable along the shaft 412.

In some implementations, the end caps 411 are retained in a positional relationship relative to ends 413 of the unitary component 402, such as in an abutting relationship with the ends 413 of the unitary component 402.

In some implementations, the shaft 412 is divided into a first portion 422 and 424. Similar to the shaft 108, described earlier, the first portion 422 and the second portion 424 are uncoupled. Dividing the shaft 412 into the first and second portion 422 and 424 provides for increased ease of maintenance of the roll assembly 400, such as when one or more of the bats 407 or brushes 408 is desired to be replaced. In some implementations, the shaft 412 is coupled to the unitary component 402 in a manner similar to that described above with respect to the shaft 108 and unitary component 102. For example, the shaft 412 and unitary component 402 may be coupled with one or more pins. In some instances, one or more pins are used to couple the shaft 412 to the unitary component 402 in situations where the shaft 412 is a single component or is divided into different portions, such as portions 422 and 424. The one or more pins connect the shaft 412 and the unitary component 402 and maintain a relative position therebetween. In other implementations, the shaft 412 and the unitary component 102 may be joined in other ways.

An advantage provided by the roll assembly 400 is that the bats 407 and brushes 408 are removable from the unitary component 402 by removal of one or both of the end caps 411. With an end cap 411 removed from the shaft 412, the bats 407 and brushes 408 are removable from the unitary component by sliding the bats 407 and brushes 408 along the slots 404. New bats 407 and brushes 408, for example, are assembled to the unitary component 402 by sliding the bats 407 and brushes 408 into a respective slot 404 from one of the ends 413 of the unitary component 402. In this way, removal of the entirety of the roll assembly 400 from a cotton harvester is unnecessary. Consequently, an amount of time to service the roll assembly 400 is reduced. With the bats 407 and 408 received into the respective slots 404, the end cap 411 is reassembled onto the shaft 412 and secured thereto, such as with the pin 422.

FIG. 6 is a cross-sectional view of the unitary component 402. As shown, the unitary component 402 includes the central passage 410 and a plurality of cavities 426 that reduce a mass of the unitary component 402 and, thus, the rotational inertia of the unitary component 402 and roll assembly 400 generally. The unitary component 402 also includes a plurality of webs 428. In some implementations, the webs 428 have a common thickness T. The webs 428 improve a stiffness of the unitary component 402 and, thus, the roll assembly 400. In the illustrated example, the central passage 410 has a hexagonal shape that is complementary to the hexagonal cross-sectional shape of the shaft 412. As explained earlier, the shaft 412 and the central passage 410 have interlocking shapes that prevent rotation of the unitary component 402 relative to the shaft 412. In other implementations, the central passage 410 and the shaft 412 can have other interlocking cross-sectional shapes. Further, in some implementations, the thickness T of the webs 428 is uniform. In other implementations, the thickness T is not uniform.

In some implementations, the unitary component 402 is formed by extrusion. In some implementations, the unitary component 402 is formed from aluminum. In some instances, the unitary component 402 is an aluminum extrusion. However, in other implementation, other types of material or forming processes can be used. For example, in some instances, other materials such as magnesium, steel, iron, polymers, or composite materials are used to form the unitary component 402. Further, in some instances, the unitary component 402 is formed using machining techniques, such as electric discharge machining, water jetting, or plasma cutting. In still other implementations, the unitary components 402 is formed from two or more components that are permanently secured together using, for example, an adhesive or welding.

Without in any way limiting the scope, interpretation, or application of the claims appearing below, a technical effect of one or more of the example implementations disclosed herein is providing a roll assembly for cotton harvesters that is formed from a reduced number of components. As a result, roll assemblies within the scope of the present disclosure have reduced complexity, a reduced time of manufacture, and, consequently, reduced manufacturing costs. Another technical effect of one or more of the example implementations disclosed herein is reducing a time and cost associated with maintaining the roll assemblies within the scope of the present disclosure. Another technical effect of one or more of the example implementations disclosed herein is reduced labor and associated costs with manufacturing and maintaining the roll assemblies within the scope of the present disclosure.

While the above describes example implementations of the present disclosure, these descriptions should not be viewed in a limiting sense. Rather, other variations and modifications may be made without departing from the scope and spirit of the present disclosure as defined in the appended claims.

What is claimed is:

1. A roll assembly for a cotton harvester comprising:
   a unitary component including:
      a central portion forming a central passage;
      a plurality of lobes radially arranged about the central portion, wherein the plurality of lobes includes first lobes and interstice is interstices are formed between adjacent first lobes;
      a plurality of radially arranged first slots formed between adjacent lobes of the plurality of lobes;
      a second slot formed longitudinally along the unitary component; and
      second lobes receivable into the interstices, wherein at least one of the first slots is defined by a side of one of the first lobes and a side of one of the second lobes;
   one of a bat or a brush disposed in each of the plurality of first slots; and
   a fastener that is sliding received in the second slot to secure one of the second lobes to the unitary component.

2. The roll assembly of claim 1, wherein the first slots have a tapered cross-sectional shape.

3. The roll assembly of claim 2, wherein the first slots taper outwardly.

4. The roll assembly of claim 1, wherein the one of a bat or a brush disposed in the plurality of first slots includes an arrangement in which a bat and a brush are disposed in an alternating arrangement within the first slots.

5. The roll assembly of claim 1, further comprising a shaft receivable into the central passage.

6. The roll assembly of claim 5, wherein the shaft and the central passage having interlocking shapes that prevent rotation of the unitary component relative to the shaft.

7. The roll assembly of claim 5, further comprising an end cap removable receivable onto the shaft and disposed adjacent to an end of the unitary component.

8. The roll assembly of claim 7, wherein the end cap includes a plurality of flange segments, wherein each flange segment is received over a portion of one of the lobes.

9. The roll assembly of claim 8, wherein a third slot is formed between adjacent flange segments and wherein one of the bat or the brush is received into the third slot.

10. The roll assembly of claim 1, wherein at least one of the second lobes defines a tapered cross-sectional shape.

11. The roll assembly of claim 1, wherein at least one of the plurality of lobes has an inwardly tapered cross-sectional shape.

12. The roll assembly of claim 1, wherein the plurality of lobes are hollow.

13. The roll assembly of claim 1, wherein each of the plurality of lobes is angularly offset from another of the plurality of lobes by 60°.

14. A method comprising:
   inserting one of a bat or a brush into a first longitudinally extending first slot defined at least partially by an elongated unitary component, wherein the elongated unitary component includes a plurality of first lobes and a plurality of interstices, each interstice formed between adjacent first lobes;

inserting the other of the bat or brush into a second longitudinally extending first slot;

inserting a shaft into a central passage formed in the elongated unitary component;

installing a second lobe into at least one of the interstices, wherein the first longitudinally extending slot is defined between a side of the second lobe and a side of one of the first lobes; and sliding a fastener into a second slot to secure the second lobe, wherein the second slot extends longitudinally along the elongated unitary component.

15. The method of claim 14, wherein:

the elongated unitary component includes:
- a central portion forming a central passage; and
- a plurality of lobes radially arranged about the central portion, and the longitudinally extending first slots are formed between the plurality of lobes.

\* \* \* \* \*